United States Patent
Englander et al.

(10) Patent No.: US 9,319,639 B1
(45) Date of Patent: Apr. 19, 2016

(54) MULTI-CAMERA BUILT-IN MONITOR SYSTEM

(71) Applicant: ROSCO INC., Jamaica, NY (US)

(72) Inventors: Benjamin Englander, Woodmere, NY (US); Julian Serer, Plainview, NY (US); Peter Plate, Northport, NY (US); Gary Balsam, East Brunswick, NJ (US)

(73) Assignee: Rosco, Inc., Jamaica, NY (US)

( * ) Notice: Subject to any disclaimer, the term of this patent is extended or adjusted under 35 U.S.C. 154(b) by 520 days.

(21) Appl. No.: 13/664,419

(22) Filed: Oct. 31, 2012

Related U.S. Application Data

(60) Provisional application No. 61/553,532, filed on Oct. 31, 2011.

(51) Int. Cl.
*H04N 7/00* (2011.01)
*H04N 7/18* (2006.01)

(52) U.S. Cl.
CPC ...................................... *H04N 7/181* (2013.01)

(58) Field of Classification Search
CPC .... B60R 1/00; B60R 2300/105; B60R 11/04; B60R 2300/802; H04N 7/181
See application file for complete search history.

(56) References Cited

U.S. PATENT DOCUMENTS

| | | | | |
|---|---|---|---|---|
| 7,583,184 | B2 * | 9/2009 | Schofield et al. | 340/438 |
| 7,855,755 | B2 * | 12/2010 | Weller et al. | 349/11 |
| 8,063,753 | B2 * | 11/2011 | Deline et al. | 340/425.5 |
| 8,083,386 | B2 * | 12/2011 | Lynam | 362/494 |
| 2006/0147264 | A1 * | 7/2006 | Doran | 404/73 |
| 2008/0225538 | A1 * | 9/2008 | Lynam et al. | 362/494 |
| 2012/0086808 | A1 * | 4/2012 | Lynam et al. | 348/148 |

* cited by examiner

*Primary Examiner* — Jay Au Patel
*Assistant Examiner* — Frank Huang
(74) *Attorney, Agent, or Firm* — Stroock & Stroock & Lavan, LLP

(57) ABSTRACT

A rear-view mirror and modular monitor system and method includes an interior mirror that embeds a modular monitor behind see-through mirror glass. In some embodiments, the system includes multiple cameras, some in the vehicle, bus and/or truck, as well as some cameras outside the vehicle, bus and/or truck, advantageously providing the driver an opportunity to view what is happening, for example, in the back rows of the bus and/or cabin, while also using the mirror to look at objects in the bus and/or cabin that are visible using the mirror. The rear-view mirror and modular monitor system is configured to be easily assembled and/or disassembled when necessary for maintenance and/or to replace parts.

35 Claims, 13 Drawing Sheets

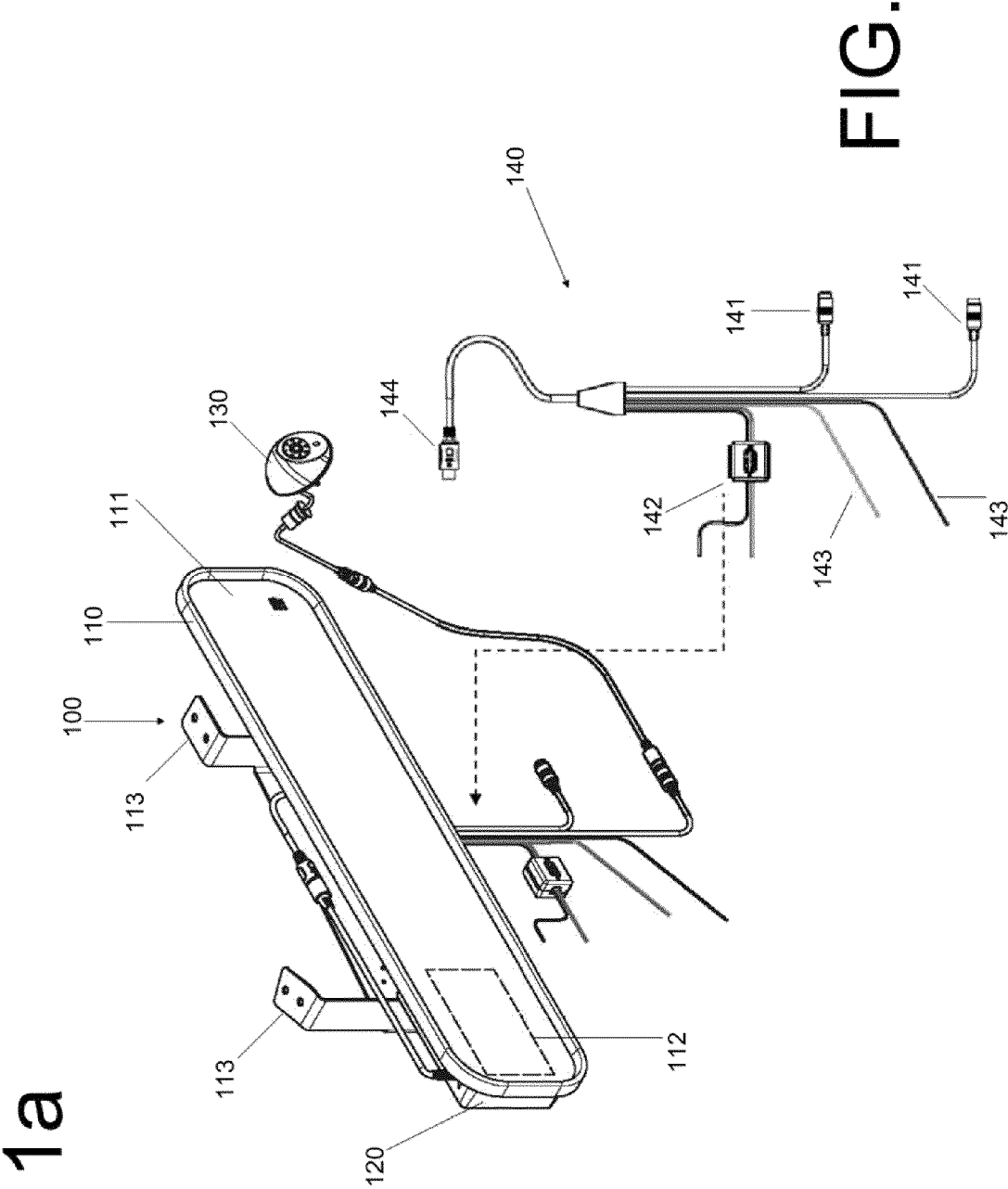

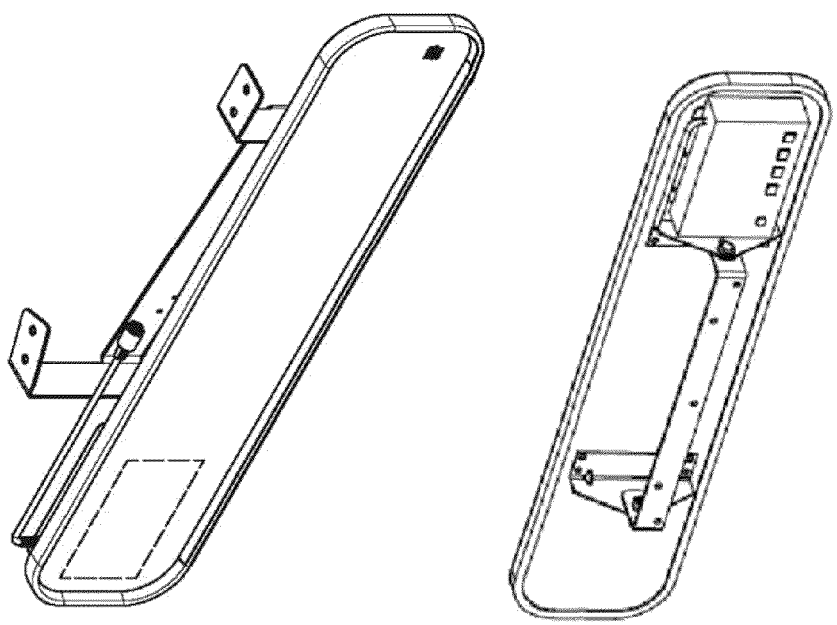
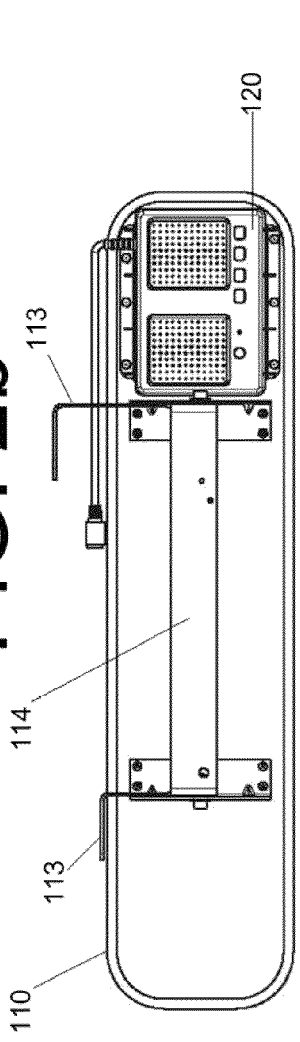
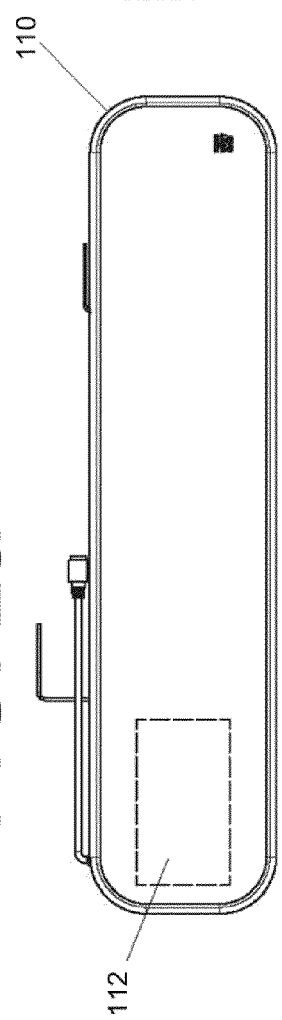

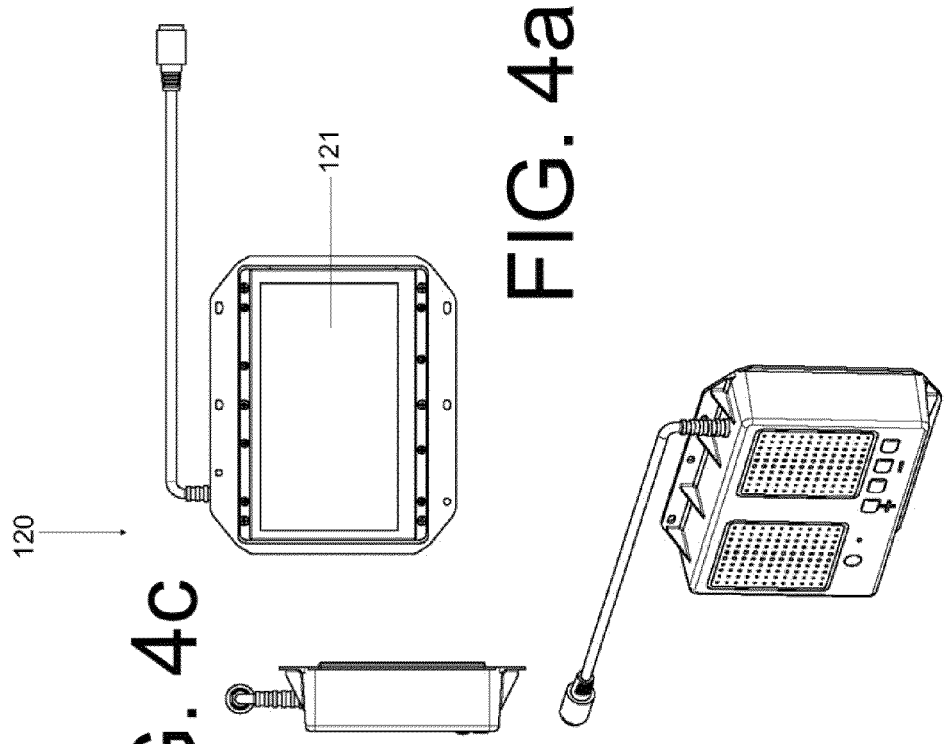
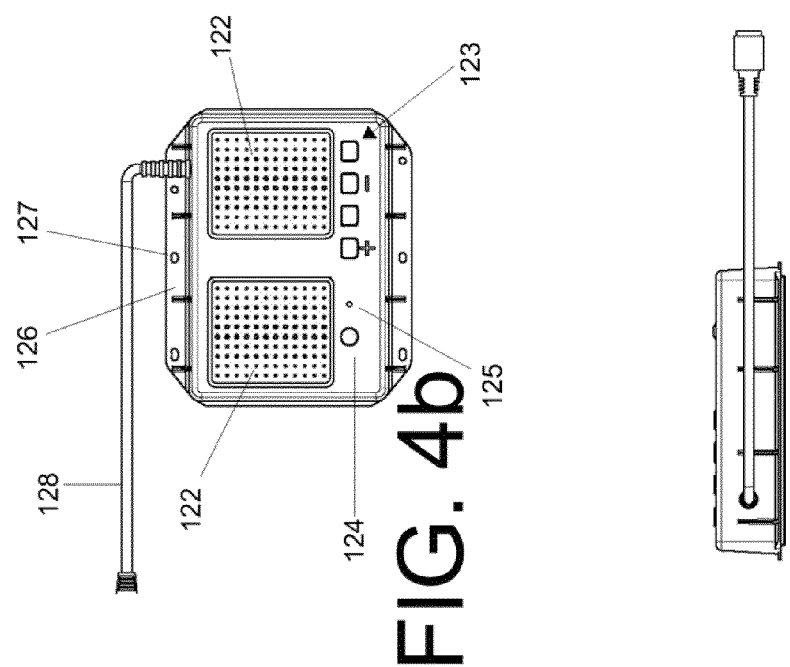

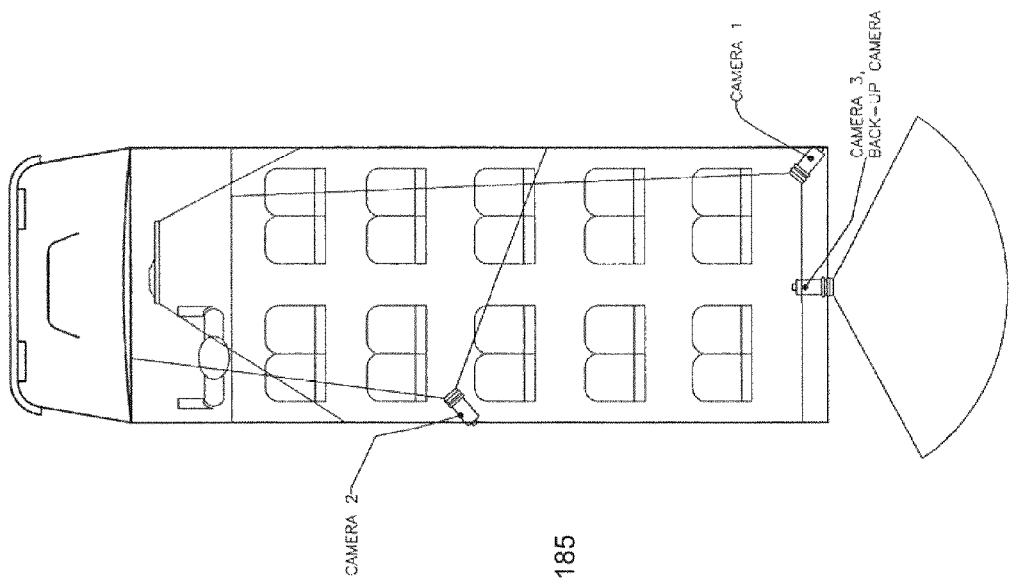

MULTI-CAMERA BUILT-IN MONITOR SYSTEM

RELATED APPLICATIONS

This Application claims priority to U.S. Provisional Application No. 61/553,532, filed on Oct. 31, 2011, which is hereby incorporated by reference herein in its entirety.

FIELD OF THE INVENTION

A vehicle monitoring system and methods of use are provided. In some embodiments, a rear-view mirror and modular monitor system for enhanced viewing by a vehicle operator of areas within and/or exterior to a vehicle, and methods of using the system, are provided.

BACKGROUND OF THE INVENTION

Existing vehicle monitoring systems capture still images and/or video images, and are displayed on a monitor for the vehicle operator to view. For example, many large vehicles are equipped with a back-up camera and a monitor to assist the vehicle operator in moving the vehicle in reverse. However, such monitors can be a cause of excessive distraction for the vehicle operator, depending on their location.

In addition, many monitoring systems are installed such that, due to the configuration of the parts, and the method of installation, should an integral part like the monitor malfunction, accessing, fixing and/or replacing the integral part is often cumbersome and expensive.

SUMMARY OF THE INVENTION

Accordingly, a rear-view mirror and modular monitor system is provided that includes an interior mirror that in some embodiments embeds a modular monitor behind, for example, see-through mirror glass. In some embodiments, the system includes multiple cameras, some in the vehicle, bus and/or truck, as well as some cameras outside the vehicle, bus and/or truck, advantageously providing the driver, other individual and/or other vehicle passenger an opportunity to view what is happening, for example, in the back rows of the bus and/or cabin, while also using the mirror to look at objects in the bus and/or cabin that are visible using the mirror.

Embodiments of the rear-view mirror and modular monitor system enable the maximizing of safe usage by automating when the modular monitor will display images, and when the driver will have full view of the rear-view mirror. For example, one type of automation is time based, wherein a certain intervals images are displayed (e.g., during hours when it is known that children will be on-board a bus). Another type of automation is event-based, wherein an image may be displayed when the door of vehicle is opened, when red flashers are activated, and/or when the stop arm is activated. Images from a rear-view camera may be displayed in some embodiments only when the vehicle is placed in reverse. In some embodiments, two or more of the above automated viewing features may be used in combination.

In some embodiments the system comprises manual input selection, for use in certain situations. For example, when a driver cannot see activity happening being high seat backs or otherwise outside the view of the driver, even with a rear-view mirror, a driver may choose to view such activity without having to stop the vehicle or adjust the rear-view mirror.

In some embodiments, audio may be provided to the vehicle operator in coordination with video being displayed. For example, a driver may have a need to hear audio from an area inside or outside the vehicle. Embodiments of the system therefore provide microphones at or near locations where cameras are capturing images, and the audio can be provided to the driver along with the images, by way of a speaker, headset, or the like. Such microphones may be built in to the cameras, or stand-alone devices.

Additionally, in some embodiments, the rear-view mirror and modular monitor system is configured to be easily assembled and/or disassembled when necessary. The rear-view mirror and modular monitor system is provided wherein parts can be attached and/or detached and parts can be replaced easily, as necessary.

In one exemplary embodiment, a rear-view mirror and modular monitor system enhances viewing for a vehicle operator of areas within and/or exterior to a vehicle. The system includes a rear-view mirror mounted forward of the vehicle operator and at a location unobstructive of the vehicle operator's forward field of view. The system includes a section of the rear-view mirror including a see-through mirror glass and/or a display aperture and a monitor module fastened to a rear side of the rear-view mirror and aligned with the see-through mirror glass section and/or the display aperture. A first image capture device is mounted at a first location inside and/or outside the vehicle, and configured to capture and transmit a first image that is displayable on the monitor module. In some embodiments, when the first image is transmitted to and displayed on the monitor module, the first image is viewable through the see-through mirror glass section and/or the display aperture.

In some embodiments, the system further includes a gasket disposed between the see-through mirror glass section and the monitor module configured to channel visible light emitted from a display on the monitor module through the see-through mirror glass section and/or the display aperture of the rear-view mirror, while providing protection for the display when the monitor module is fastened to the rear-view mirror. In some embodiments, the gasket is shaped so as to be proximately alignable with a perimeter of the display.

In some embodiments, the monitor module is configured to be removable from the rear-view mirror and reinsertable in the same rear-view mirror and/or another rear-view mirror. In some embodiments, the system further includes an image storage device configured for image storage.

In some embodiments, the system further includes a protective enclosure encasing the first image capture device and the image storage device and protecting the first image capture device and the image storage device from damage, tampering, and/or theft.

In some embodiments, the system further includes a connection device temporarily connecting the monitor module to the rear-view mirror and enabling the monitor module to be removed from and re-connected to or replaced from at the rear-view mirror and/or another rear-view mirror.

In some embodiments, the first image is captured, transmitted, and/or displayed responsive to a manually selected view, an automatically selected view, and/or an event-triggered selected view.

In some embodiments, the system further includes a second image capture device mounted at a second location inside and/or outside the vehicle, and configured to capture and transmit a second image to the monitor module. In some embodiments, the system further includes an input switch connected to the first image capture device and the second image capture device, and configured to provide the first image and the second image to the monitor module responsive to a manually selected view, an automatically selected view, and/or an event-triggered selected view. In some embodiments, the monitor module further includes two or more channels configured to receive the first image and the second image. The monitor module is further configured to display the first and second images either together in a multiple-feed configuration (mode) or individually in a single-feed configuration (mode) responsive to the input switch.

In some embodiments, the system further includes a first audio capture device mounted at a first location inside and/or outside the vehicle. The monitor module further includes a first audio input and an audio output device. In some embodiments, the first audio capture device is configured to capture a first audio signal and provide the first audio signal to the first audio input, and output device of the monitor module is configured to provide the first audio signal to the vehicle operator. In some embodiments, the first location of the first audio capture device is in a location that is proximate to the first location of the first image capture device, and the monitor module is configured to provide the first audio signal to the vehicle operator responsive to the first image being displayed on the monitor module.

In some embodiments, the see-through mirror glass section is configured so as to be reflective when no image is displayed on the monitor module, and sufficiently transparent for the first image to be viewable when the first image is displayed on the monitor module.

In some embodiments, the monitor module further includes a photocell light sensor configured to detect ambient light at, around, or in a location affecting the location of the monitor module. In some embodiments, the monitor module is further configured to adjust a brightness level of the first image when the first image is displayed, responsive to the photocell light sensor.

In another exemplary embodiment, a rear view mirror and modular monitor system for enhanced viewing by a vehicle operator of areas within and/or exterior to a vehicle is provided. The system comprises a rear-view mirror mounted forward of the vehicle operator and at a location unobstructive of the vehicle operator's forward field of view, at least a section of said rear-view mirror comprising see-through mirror glass. In the system, a monitor module is fastened to a rear side of the rear-view mirror, aligned with the see-through mirror glass section. In some embodiments, a first image capture device is mounted at a first location inside and/or outside the vehicle, and is configured to provide a first image displayable on the monitor module. In some embodiments, the system further includes a second image capture device mounted at a second location inside and/or outside the vehicle configured to provide a second image displayable on the monitor module. In some embodiments, an input switch is connected to the first and second image capture devices, and is configured to provide the first image and/or the second image to monitor module responsive to a manually selected view, an automatically selected view, and/or an event-triggered selected view.

In some embodiments, when the first image and/or the second image is provided to and displayed on the monitor module, the first image and/or the second image is viewable through the see-through mirror glass section.

In some embodiments, the system further includes a first audio capture device mounted proximate to the first location of the first image capture device and a second audio capture device mounted proximate to the second location of the second image capture device. The monitor module further includes a first audio input, a second audio input, and at least one audio output device. In some embodiments, the first audio capture device is configured to capture a first audio signal and provide the first audio signal to the first audio input, and the second audio capture device is configured to capture a second audio signal and provide the second audio signal to the second audio input. In some embodiments, the audio output device is configured to provide the first audio signal to the vehicle operator responsive to the first image being displayed on the monitor module, and/or the second audio signal responsive to the second image being displayed on the monitor module. In some embodiments, the system further includes an image storage device configured to store the first image and/or the second image.

In another exemplary embodiment, a method of providing a rear-view mirror and modular monitor system for enhanced viewing by a vehicle operator of areas within and/or exterior to a vehicle is provided. The system includes the sequential, non-sequential, and/or sequence-independent steps of mounting an rear-view mirror forward of the vehicle operator and at a location unobstructive of the vehicle operator's forward field of view, a section of said rear-view mirror including see-through mirror glass. In some embodiments, the method further includes fastening a monitor module to a rear side of the rear-view mirror aligned with the see-through mirror glass section. The method further includes mounting a first image capture device at a first location inside and/or outside the vehicle configured to capture and transmit a first image to the monitor module. The method further includes connecting the first image capture device to the monitor module, using a wired and/or wireless connection, to provide the first image to the monitor module viewable through the see-through mirror glass section.

In some embodiments, the method further includes installing a gasket between the see-through mirror glass section and the monitor module to channel visible light emitted from a display on the monitor module through the at least one see-through mirror glass section of the rear-view mirror, while providing protection for the display when the monitor module is fastened to the rear-view mirror. In some embodiments, the method further includes aligning the gasket with a perimeter of the display and securing the gasket in place.

In some embodiments, the method further includes configuring the monitor module to be removable from the rear-view mirror and reinsertable in the same rear-view mirror and/or another rear-view mirror. In some embodiments, the method further includes providing an image storage device configured for image storage. In some embodiments, the method further includes providing a protective enclosure encasing the first image capture device and the image storage device to protect the first image capture device and the image storage device from damage, tampering, and/or theft.

In some embodiments, the step of fastening the monitor module to the rear side of the rear-view mirror further includes temporarily connecting the monitor module to the rear-view mirror using a connection device and enabling the monitor module to be removed from and re-connected to or replaced from the rear-view mirror and/or another rear-view mirror. In some embodiments, the first image is captured, transmitted, and/or displayed responsive to a manually selected view, an automatically selected view, and/or an event-triggered selected view.

In some embodiments, the method further includes mounting a second image capture device at a second location inside and/or outside the vehicle, the second image capture device being configured to capture and transmit a second image to the monitor module. In some embodiments, the system further comprises installing and/or connecting an input switch to the first and second image capture devices, and providing the first image and/or second image to the monitor module responsive to a manually selected view, an automatically selected view, and/or an event-triggered selected view. In some embodiments, the method further includes providing the monitor module with two or more channels configured to receive the first image and the second image; and displaying the first and second image together in a multiple-feed configuration (mode) and/or individually in a single-feed configuration (mode) responsive to the input switch.

In some embodiments, the method further includes mounting a first audio capture device at a first location inside and/or outside the vehicle, and providing the monitor module with a first audio input and an audio output device. In some embodiments, the method further includes capturing a first audio signal using the first audio capture device and providing the first audio signal to the first audio input of the monitor module; and providing the first audio signal to the vehicle operator using the audio output.

In some embodiments, the step of mounting the first audio capture device includes mounting the first audio capture device proximate to the first location of the first image capture device. In some embodiments, the monitor module is configured to provide the first audio signal to the vehicle operator responsive to the first image being displayed on the monitor module. In some embodiments, the method further includes configuring the see-through mirror glass section so as to be reflective when no image is displayed on the monitor module, and sufficiently transparent for the first image to be viewable when the first image is displayed on the monitor module.

In some embodiments, the method further includes providing the monitor module with a photocell light sensor configured to detect ambient light at, near, or affecting the location of the monitor module, wherein the monitor module is further configured to adjust a brightness level of the first image when the first image is displayed, responsive to the photocell light sensor.

In yet another exemplary embodiment, a method of providing a rear-view mirror and modular monitor system for enhanced viewing by a vehicle operator of areas within and/or exterior to a vehicle is provided. The method includes the sequential, non-sequential, and/or sequence-independent steps of: mounting a rear-view mirror forward of the vehicle operator and at a location unobstructive of the vehicle operator's forward field of view, a section of the rear-view mirror comprising see-through mirror glass. The method further includes fastening a monitor module to a rear side of the rear-view mirror aligned with the see-through mirror glass section. The method further includes mounting a first image capture device at a first location inside and/or outside the vehicle to provide a first image to the monitor module, and mounting a second image capture device at a second location inside and/or outside the vehicle, the second image capture device being configured to provide a second image to the monitor module.

In some embodiments, the method further includes connecting an input switch to the first and second image capture devices using a wired and/or wireless connection, to provide the first image and/or the second image to the monitor module responsive to a manually selected view, an automatically selected view, and/or an event-triggered selected view. The method further includes digitally capturing the first image by the first image capture device and/or the second image by the second image capture device, and digitally transmitting the first image and/or the second image to the monitor module responsive to the manually selected view, the automatically selected view, and/or the event-triggered selected view. In some embodiments, the method further includes displaying the first image and/or the second image on the monitor module viewable through the see-through mirror glass section.

In some embodiments, the method further includes mounting a first audio capture device proximate to the first location of the first image capture device and a second audio capture device proximate to the second location of the second image capture device. The method further includes providing the monitor module with a first audio input, a second audio input, and an audio output device. In some embodiments, the method further includes capturing a first audio signal with the first audio capture device, and transmitting the first audio signal to the first audio responsive to the capturing of the first image; and capturing a second audio signal with the second audio capture device, and transmitting the second audio signal to the second audio input responsive to the capturing of the second image. The method further includes providing the first audio signal to the vehicle operator via the audio output device responsive to the first image being displayed in the single-feed configuration on the monitor module; and providing the second audio signal to the vehicle operator via audio output device responsive to the second image being displayed in the single-feed configuration on the monitor module.

In some embodiments, the method further includes providing an image storage device and storing first image and/or the second image in the image storage device.

In still another exemplary embodiment, a method of repairing a rear view mirror and modular monitor system, the system including a rear-view mirror mounted forward of the vehicle operator and at a location unobstructive of the vehicle operator's forward field of view, a monitor module fastened to a rear side of the rear-view mirror, a first image capture device mounted at a location inside and/or outside the vehicle, and configured to provide a first image to the monitor module. The method includes the sequential, non-sequential, and/or sequence-independent steps of: unfastening the monitor module from the rear side of the rear-view mirror; replacing the monitor module and/or the rear-view mirror with a replacement part comprising another of another monitor module or another rear-view mirror. In some embodiments, the method further includes positioning the monitor module with respect to a see-through mirror glass and/or a display aperture of the rear-view mirror. Some embodiments include positioning a gasket between the monitor module and the see-through mirror glass and/or a display aperture, and refastening the fasteners to secure the replacement part to replace the monitor module and/or the rear-view mirror.

In some embodiments, the step of unfastening the monitor module from the rear side of the rear-view mirror further includes locating a plurality of fasteners, the fasteners having been threaded through a plurality of mirror apertures positioned around the see-through mirror glass section of the rear-view mirror, and through a plurality of monitor apertures positioned around a frame of the monitor module so as to align with the plurality of mirror apertures, each of the plurality of fasteners having been secured with a nut to fasten the monitor module to the rear side of the rear-view mirror. The method further includes removing the nuts from the plurality of fasteners thereby allowing the monitor module to be unfastened from the rear side of the rear-view mirror.

In still yet another exemplary embodiment, a method of enhanced viewing by a vehicle operator of areas within and/or exterior to a vehicle includes the sequential, non-sequential, and/or sequence-independent steps of: digitally capturing the first image by the first image capture device, the first image being displayable on the monitor module. The method further includes digitally transmitting the first image to the monitor module; and displaying the first image on the monitor module, wherein the first image is viewable through a see-through mirror glass section of the rear view mirror.

BRIEF DESCRIPTION OF THE DRAWINGS

The foregoing summary, including the above and other features and advantages of the herein described systems and methods, as well as a brief description of the preferred embodiments of the application will be better understood when read in conjunction with the appended drawings. For the purpose of illustrating the preferred embodiments of the present inventions, and to explain their operation, drawings of preferred embodiments and schematic illustrations are shown. It should be understood, however, that the application is not limited to the precise arrangements, variants, structures, features, embodiments, aspects, methods, advantages and instrumentalities shown, and the arrangements, variants, structures, features, embodiments, aspects, methods, advantages, improvements and instrumentalities shown and/or described may be used singularly in the system or method or may be used in combination with other arrangements, variants, structures, features, embodiments, aspects, methods, advantages, improvements and instrumentalities. In the drawings:

FIGS. 1a-b depict a general layout of a system for effectuating the present invention in accordance with some embodiments of the invention.

FIGS. 2a-d depict several views of a rear-view mirror and modular monitor assembly in accordance with some embodiments of the invention.

FIGS. 4a-e depict several views of a modular monitor in accordance with some embodiments of the invention.

FIGS. 6a-d depict several views of a vehicle with a rear-view mirror and modular monitor system installed in accordance with some embodiments of the invention.

DETAILED DESCRIPTION OF THE INVENTION

Figure 3:
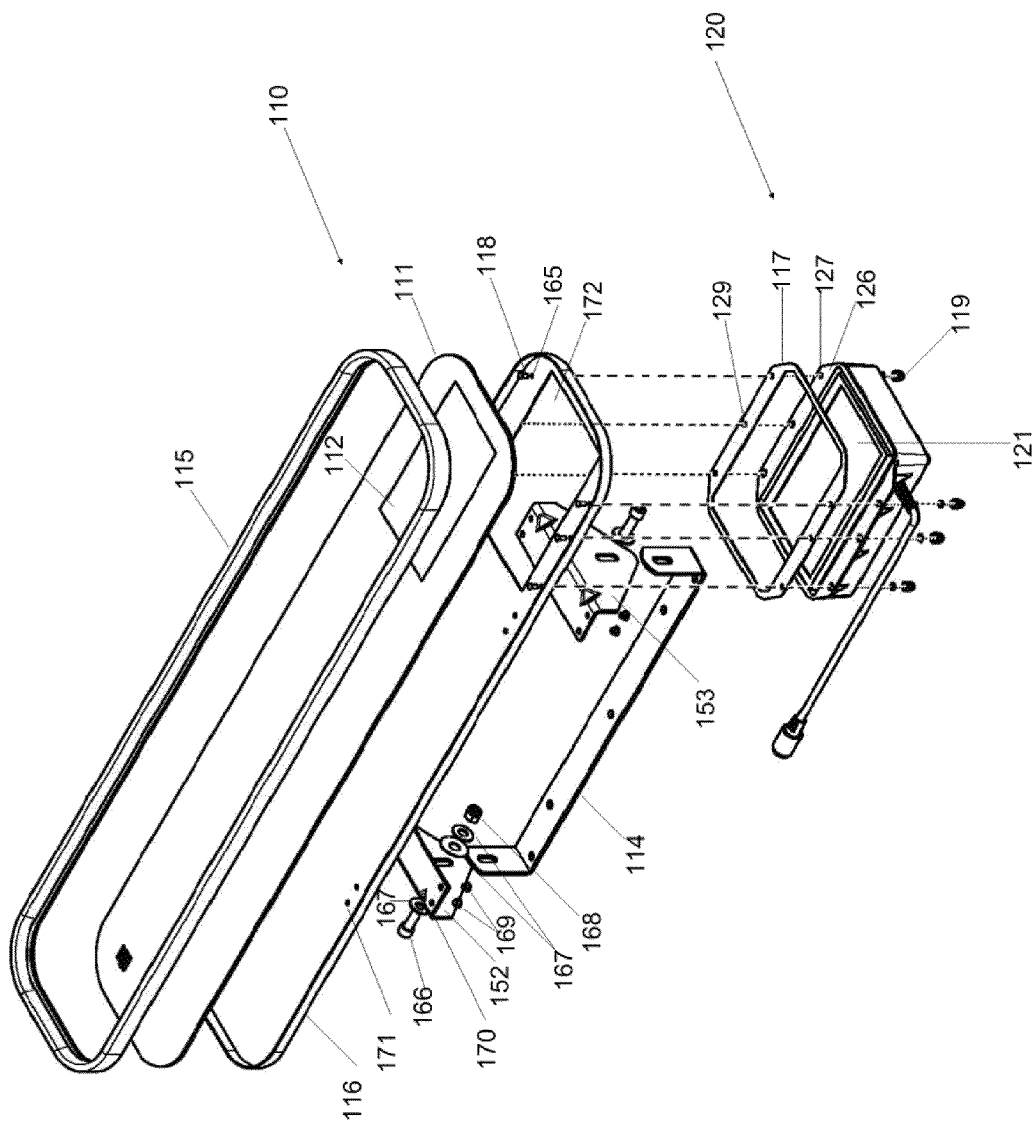
FIG. 3 depicts an exploded view of a rear-view mirror and modular monitor assembly in accordance with some embodiments of the invention.
Figures 5A, 5B, 5C, 5D:
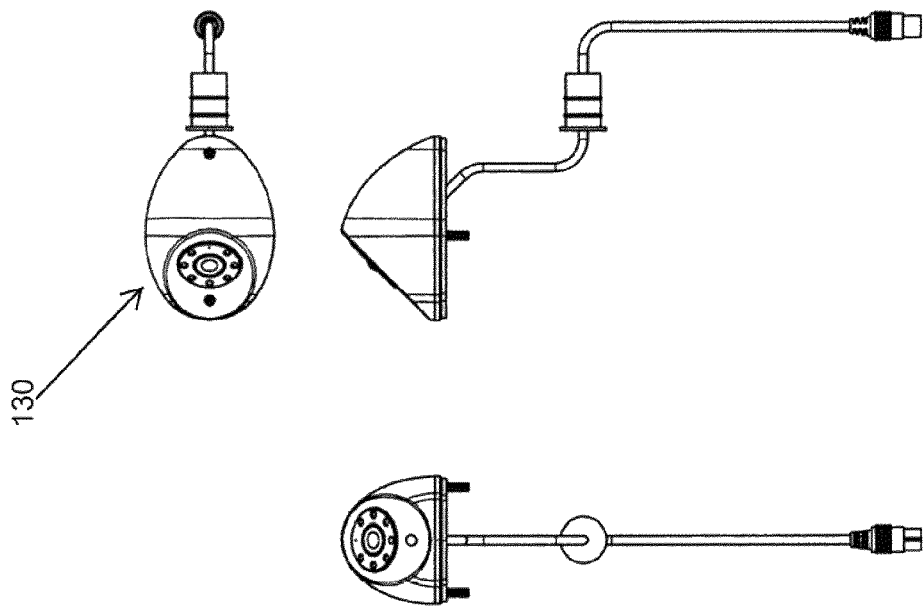
FIGS. 5a-d depict several views of an example image capture device in accordance with some embodiments of the invention.

The following description includes many specific details, the inclusion of which is for the sole purpose of illustration and should not be understood to limit the invention in any way. Moreover, certain features which are known to those of ordinary skill in the art are not described in detail in order to avoid complication of the subject matter of the present invention. In addition, it will be understood that features in an exemplary embodiment may be combined with features in other exemplary embodiments of the invention without limitation.

It is to be understood that the invention is not limited in its application to the exemplary details of construction and to the arrangements of the components set forth in the following description of exemplary embodiments or illustrated in the drawings of exemplary embodiments. The invention is capable of other alternative embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described process may be altered so that certain processes are conducted in parallel or independent, with other processes, to the extent that the processes are not dependent upon each other. Thus, the specific order of steps described herein is not to be considered implying a specific sequence of steps to perform the process. Other alterations or modifications of the above processes are also contemplated. For example, further insubstantial approximations of the process and/or algorithms are also considered within the scope of the processes described herein.

In addition, features illustrated or described as part of one embodiment can be used in or with other embodiments to yield a still further embodiment. Additionally, certain features may be interchanged with similar devices or features now known or later-developed that perform the same or similar functions. It is therefore intended that such modifications and variations are included within the totality of the present invention.

A multi-camera, rear-view mirror and modular monitor system includes a rear-view mirror that in some embodiments embeds a monitor behind, for example, see-through mirror glass. In some embodiments, the rear-view mirror and modular monitor system includes multiple cameras, some in the vehicle, bus and/or truck (collectively, "bus"), as well as some cameras outside the bus, advantageously providing the driver or other individual an opportunity to view what is happening, for example, in the back rows of the bus and/or cabin, while also using the mirror to look at objects in the bus and/or cabin, and/or behind the bus, that are visible using the mirror. In some embodiments, a standard 6×30 mirror is advantageously used in the bus to view, for example, children that are behind the driver. In some embodiments, this standard 6×30 mirror is not needed for viewing traffic behind the bus, and in some embodiments it may be used to view objects other than vehicles both inside and outside the bus. In some embodiments other standard and/or custom sized rear-view mirrors may also be used.

In some embodiments, a standard rear-view mirror is used in combination with the dual-vision camera inventions described in U.S. application Ser. No. 12/608,600, filed Oct. 29, 2009, entitled "Method and System With Multiple Camera Units Installed in Protective Enclosure," which claims priority of U.S. Application Ser. Nos. 61/109,763, filed Oct. 30, 2008 and 61/245,080, filed Sep. 23, 2009, and each of the above applications are incorporated herein by reference in its entirety.

In addition or alternatively, in some embodiments, any other suitable image capturing system is also contemplated for use either in conjunction with, or instead of, the dual-vision system. For example, any digital imaging device such as a digital camera and/or a digital video recorder may be used.

Advantageously, multiple cameras are provided in, for example, a bus or other truck or vehicle as well as some cameras outside the bus, providing the driver an opportunity to see what is happening in areas in and/or around the bus that cannot be seen in the rear-view mirror, while also using the rear-view mirror to look at passengers and objects that are visible through the mirror. In addition, in some embodiments, a monitor is either embedded behind see-through mirror glass, embedded in a cut-out aperture within the rear-view mirror, and/or otherwise attached to a portion of the rear-view mirror. In any event, the driver can view both the monitor and the rear-view mirror with relative ease and limited distraction to the driver.

In some embodiments, the interior cameras are located in the rear area of the cabin of the bus and face forward in the bus to show the driver what is happening behind the high-backs of the seats which cannot be seen when looking up at a conventional mirror. Alternatively or additionally, is some embodiments, cameras may be mounted in any suitable location to capture images which would otherwise be unviewable from the rear-view mirror. This may include ceiling mounted cameras, side wall mounted cameras, rear facing cameras, and the like.

In some embodiments, external cameras may be located anywhere around the outside of the bus that would provide views which can be helpful to the driver. As an example, the present assignee describes an exterior camera system layout and driver controls which affords a view substantially 360° around the school bus in U.S. patent application Ser. No. 13/177,302, entitled: "CAMERA SYSTEM FOR LARGE VEHICLES," filed Jul. 6, 2011, which is herein incorporated in its entirety by reference. The rear-view mirror and modular monitor system can advantageously display at least one selected imaging feed, and/or multiple imaging feeds simultaneously using standard monitor technology and/or multiple monitor modules connected to the rear view mirror. Additionally, corresponding audio for an area inside or external to the bus being displayed on the modular monitor may also be provided to the driver via the rear-view mirror and modular monitor system, which, in some embodiments, incorporates microphones built into the imaging devices and/or installed in the location of the imaging devices.

FIGS. 1a-b depict a general layout of a system for effectuating the present invention in accordance with some embodiments of the invention. In some embodiments, rear-view mirror and modular monitoring system 100 comprises, for example, at least three primary components: rear-view mirror unit 110, modular monitor 120, and imaging device 130. Modular monitor 120 and imaging device 130 are shown connected to each other via connection device 140.

In some embodiments, rear-view mirror unit 110 includes mirror 111 and at least one see-through mirror glass section 112, behind which modular monitor 120 is mounted for display. In some embodiments, mirror 111 may include a mirror cut-out aperture (not shown) in place of, or in addition to, see-through mirror glass section 112, behind which modular monitor 120 may be mounted for display. In yet other embodiments, modular monitor 120 may be mounted to any suitable portion of rear-view mirror unit 110 that provides sufficient viewing of modular monitor 120 and mirror 111.

In some embodiments, mirror 111 is a sheet of glass coated on the back side with black and chrome paint, making the front side reflective, similar to any standard rear-view mirror. As described herein, in some embodiments, a see-through mirror glass section may refer to a section of mirror 111 where the glass is coated with chrome paint only, or otherwise treated so as to make a standard see-through glass section 112 sufficiently transparent (when viewed from the front) when a strong enough light source, such as the light from an activated monitor display, is channeled through the back of the section, and is otherwise reflective (when viewed from the front side) when the light source is not provided or otherwise insufficient.

In some embodiments, rear-view mirror unit 110 includes mirror unit mounting brackets 113. The configuration of mirror unit mounting brackets 113 is merely exemplary, and any suitable configuration which provides proper mounting support for rear-view mirror unit 110 in a vehicle is likewise contemplated. Additionally or alternatively, in some embodiments, rear-view mirror unit 110 may be provided with a standard locking mechanism, as described in further detail in the description of FIG. 7, to lock rear-view mirror unit 110 in place.

In some embodiments, image capture device 130 is a standard digital still and/or video camera. In some embodiments, image capture device 130 also includes Infrared (IR) Light Emitting Diode (LED) lighting (or equivalent IR lighting) for capturing images in low or no visibility without requiring a flash or other bright light source. In some embodiments, a standard light source may be provided in addition to or in place of IR LED lighting. While image capture device 130 is shown here with a wired connection to modular monitor 120, in some embodiments image capture device 130 may be a wireless device, which is controlled and transmits captured images wirelessly via a wireless transmission such as Wi-Fi, Bluetooth, IR, cellular etc. Furthermore, while image capture device 130 is shown here as a stationary camera, in some embodiments image capture device 130 may be a standard motorized, multi-directional manually/automatically controlled camera, which may provide the operator with additional views inside and/or outside the bus. In some embodiments, image capture device 130 is powered by at least one of the vehicle's internal power source, and a stand-alone power source such as a rechargeable camera battery or a solar cell.

In some embodiments, connection device 140 comprises one or a plurality of input feeds 141. In some embodiments, the input feeds 141 are standard video input feeds, which can be connected to any number and combination of devices. For example, input feeds 141 may be connected to multiple image capture devices 130 and/or a combination of image capture devices 130, audio capture devices (not shown), e.g., a microphone, and/or other sensors, e.g., a photocell light sensor, as desired. In some embodiments, connection device 140 further comprises power feed 142 for providing power to modular monitor 120 from a power source (not shown), e.g., the vehicle battery, and line out feed 143, for connecting modular monitor 120 to an output device such as, for example, a stand-alone speaker (not shown) or additional monitor (not shown).

In some embodiments, connection device 140 includes monitor video feed 144, to provide at least one a digital image, an audio signal, sensor data, and power to the monitor, and to provide output from the modular monitor 120 to an output device. It will be readily understood by those of ordinary skill in the art that, while in the embodiments described herein, connection device 140 is shown as one comprehensive configuration, other embodiments providing for multiple separate standard connection devices and/or other configurations employing standard connection devices and/or wireless connections may also be used.

FIGS. 2a-d depict several views of a rear-view mirror and modular monitor assembly in accordance with some embodiments of the invention. In particular FIG. 2a depicts a front view rear-view mirror unit 110 and see-through mirror glass section 112, the exemplary location of which is depicted by a hash-lined rectangle. It will again be readily understood by those of ordinary skill in the art that, while in the embodiments described herein, see-through mirror glass section 112 is depicted as being rectangular in shape, any other shape suitable for commensurate with the shape of a monitor display to be attached thereto is also contemplated. Additionally, as explained above, while the hash-lined rectangle is described as indicating the general location of see-through mirror glass section 112, in some embodiments, the hash-lined rectangle indicates the general location of a mirror cut-out aperture (not shown) in place of, or in addition to, see-through mirror glass section 112, behind which modular monitor 120 may be mounted for display. In yet other embodiments, modular monitor 120 may be mounted to any suitable portion of rear-view mirror unit 110 that provides sufficient viewing of modular monitor 120 and mirror 111, without necessitating see-through mirror glass section 112 or a mirror cut-out aperture. In yet other embodiments, the rear-view mirror may include an additional section, slot or receptacle, optionally molded, within and/or integrated with the housing to accommodate the monitor for connection and facilitate easy removal therefrom.

FIG. 2b depicts a back view of the exemplary rear-view mirror unit 110 of FIG. 2a, with modular monitor 120 fastened to the back, adjacent to the reverse (back) side of the location of see-through mirror glass section 112. It will again be readily understood by those of ordinary skill in the art that, while in the embodiments described herein, see-through mirror glass section 112 and modular monitor 120 are shown located to one side of rear-view mirror unit 110, this is merely exemplary, and other locations along mirror 111 are also contemplated. In addition to depicting mirror unit mounting brackets 113, FIG. 2b also depicts fixed mounting bracket 114, which is discussed in greater detail in the description of FIG. 7 below. Other embodiments include fewer or more brackets, and other configurations as necessary to secure rear-view mirror unit 110 in place. It should also be noted that, while the embodiments described herein depict rear-view mirror unit 110 as being fastened to an internal portion of a vehicle, alternative embodiments wherein rear-view mirror unit 110 is mounting to an external portion of a vehicle are also provided.

FIGS. 2c-d depict several alternative views of rear-view mirror unit 110 and modular monitor 120 in accordance with some embodiments.

FIG. 3 depicts an exploded view of a rear-view mirror and modular monitor assembly in accordance with some embodiments of the invention. In particular, FIG. 3 shows how modular monitor 120 may be fastened to rear-view mirror unit 110, and how rear-view mirror unit 110 may be assembled, in accordance with some embodiments of the invention.

In accordance with some embodiments, modular monitor 120 may be fastened to rear-view mirror unit 110 with the use of self-clinching threaded pin fasteners, such as monitor fasteners 118, and monitor nuts 119 for securing monitor fasteners 118 in place. Other types of fasteners may alternatively be used as well, such as screws, adhesives, snap fit, adhesive tape, velcro and the like. In some embodiments, modular monitor 120 may be fastened directly to mirror unit backing 116 by threading monitor fasteners 118 through mirror unit backing apertures 165 located around the perimeter of backing cut-out 172, and through modular monitor apertures 127, which are located along the perimeter of monitor frame 126, and securing monitor fasteners 118 in place with monitor nuts 119.

However, in other embodiments, modular monitor 120 is fastened to mirror unit backing 116 with monitor gasket 117 disposed therebetween. Monitor gasket 117 optionally includes gasket apertures 129. In some embodiments, monitor fasteners 118 are threaded first through mirror unit backing apertures 165, then through gasket apertures 129, and finally through modular monitor apertures 127, after which they are secured with monitor nuts 119.

In some embodiments, monitor gasket 117 advantageously serves to block external light from disturbing an image displayed on modular monitor 120 by reaching monitor display 121 from between modular monitor 120 and the reverse side of see-through mirror glass section 112. Monitor gasket 117 also serves to channel the light (image) emitted by monitor display 121 through the reverse side of see-through mirror glass section 112, as well as to protect monitor display 121 from any incidental rubbing or scratching against mirror unit backing 116. In some embodiments, monitor gasket 117 is configured and shaped to follow the perimeter of monitor display 121.

As shown in FIG. 3, in some embodiments, rear-view mirror unit 110 is further assembled by inserting mirror 111 into mirror unit backing 116 and affixing mirror 111 in place using mirror frame 115. In some embodiments, mirror frame 115 is fastened to mirror unit backing 116 by way of additional fasteners. In other embodiments, mirror frame 115 is shaped and configured so as to become affixed to mirror unite backing 116 when a sufficient force is applied to mirror frame 115, so that at least a portion of mirror frame 115 is held in place over mirror unit backing 116, such as, for example, by employing the use of a lip, indentation, or groove (not shown) to which mirror frame 115 can attach. Other methods of attachment are of course also contemplated, such by use of an adhesive or bond.

In some embodiments, assembly of rear-view mirror unit 110 may be completed by affixing fixed mounting bracket 114 to mirror unit backing 116. In some embodiments, fixed mounting bracket 114 is connected to L-brackets 152 and 153 using fastener 166, washers 167, and nuts 168. L-brackets 152 and 153 are connected to mirror unit backing 116, for example, by inserting fasteners 169 through L-bracket apertures 170 and affixing them to backing bracket apertures 171.

While the above description of FIG. 3 provides an example embodiment of an assembly of rear-view mirror unit 110 and modular monitor 120, those of ordinary skill in the art will readily recognize that many features of the above descriptions are exemplary in nature. For example, in place of a fastener, an adhesive or bond might be employed.

FIGS. 4a-e depict several views of a modular monitor in accordance with some embodiments of the invention. FIG. 4a depicts a front view of modular monitor 120 in accordance with some embodiments. As can be seen in FIG. 4a, modular monitor 120 includes monitor display 121 on a front face of the monitor. In some embodiments monitor display 121 is an LCD monitor. However, other display types are also contemplated, such as LED monitors, etc. In some embodiments, monitor display 121 provides strong enough light levels so that images displayed on monitor display 121 will be clearly visible through see-through mirror glass section 112. In alternative embodiments when a mirror cut-out aperture is used in place of see-through mirror glass section 112, a relatively weaker display may be sufficient for proper visibility of the images.

FIG. 4b depicts a back view of modular monitor 120 in accordance with some embodiments. As can be seen in FIG. 4b, modular monitor 120 includes monitor speakers 122 on a rear face of the monitor. Of course, in other embodiments, monitor speakers 122 may be located on another side of modular monitor 120. In yet other embodiments, no speakers are integrated into modular monitor 120, as can be seen, for example, in FIG. 2d. In some embodiments, an output port is provided in addition to, or in place of, monitor speakers 122, to provide audio output to external audio devices such as an external speaker, wired headsets, and/or wireless headsets.

In some embodiments, manual controls 123 are provided on modular monitor 120. In some embodiments, manual controls 123 control power, volume, input selection, settings for automatic use, and/or other settings. In some embodiments, modular monitor 120 includes sensor 124 and indicator light 125. In some embodiments, sensor 124 may be a photocell light sensor, which detects levels of ambient light in the area around modular monitor 120, and can adjust the brightness of monitor display 121 to compensate for excess and/or insufficient light. Indicator light 125 may be configured to indicate, for example, that modular monitor 120 is powered on or off, and/or operating correctly.

In some embodiments, modular monitor 120 may have built-in and/or removable memory (not shown) for recording images and/or audio.

FIGS. 4c-e depict additional views of modular monitor 120 in accordance with the invention.

FIGS. 5a-d depict several views of example image capture device 130 in accordance with some embodiments of the invention. As explained above, in some embodiments, image capture device 130 may be for example, a standard digital still and/or video camera, an IR/LED camera or the like. Additionally, in some embodiments, image capture device 130 may further comprise a built-in audio capture device (microphone). Furthermore, though image capture device 130 is shown with a wired connection device, a partially or completely wireless image capture device is also contemplated. Likewise, in some embodiments, image capture device 130 may be powered by the vehicle, and/or may have an internal battery.

FIGS. 6a-d depict several views of a vehicle with a rear-view mirror and modular monitor system installed in accordance with some embodiments of the invention. In some embodiments, as illustrated in FIG. 6a seen from behind the driver, when the bus is in reverse, monitor display 121 can be configured to always show camera 3 view (back-up) as shown in FIG. 6d. When not in reverse, the driver can then choose video inputs from cameras 1, 2, or 3 (exemplary locations of which are depicted in FIG. 6d) from video input switch 180, or choose no view at all (full mirror view).

In alternative embodiments, as illustrated in FIG. 6b seen from behind the driver, when the vehicle is in reverse, monitor display 121 can be configured to always show camera 3 view (back-up). When not in reverse, the driver can use video input switch 180, located on dashboard 185, to choose a single-feed configuration providing a video input from either camera 1 or camera 2, a multiple-feed configuration providing a split video input of cameras 1 and 2, input from camera 3, or no view at all (full mirror view).

In additional alternative embodiments, the selection of the view for the monitors can be based on driver preference using a standard input switch mechanism, manually or manually activated?. For example, when not in reverse mode, the driver might still want camera 3 providing input to the monitor as part of the multiple-feed split video configuration.

FIG. 6c depicts a view from above of an exemplary location of rear-view mirror unit 110 and video input switch 180 relative to the driver. FIG. 6d provides exemplary mounting locations for cameras within an external to the bus.

Figure 7:
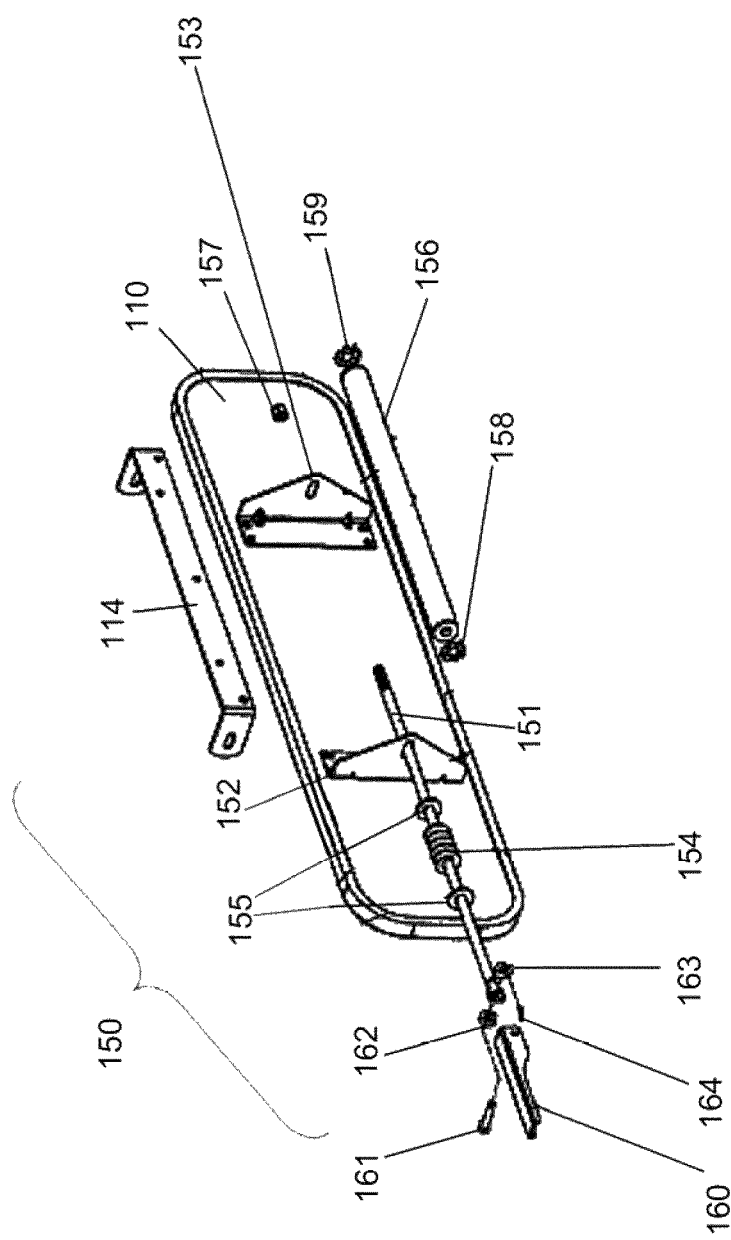
FIG. 7 depicts parts of an optional lever lock mechanism which can be used to lock a rear-view mirror and modular monitor assembly in place in accordance with some embodiments of the invention.

FIG. 7 depicts an optional lever lock mechanism which can be used to lock a rear-view mirror and modular monitor assembly in place in accordance with some embodiments of the invention. In some embodiments, an optional lever lock mechanism can be used to lock rear-view mirror unit 110 in place in the vehicle as currently offered by Rosco, Inc. of Jamaica, N.Y. and the assignee of the present application. According to some embodiments, FIG. 7 depicts parts of the rear-view mirror unit's locking mechanism 150, including the fixed mounting bracket 114 attached to the vehicle and the shaft with a threaded end 151 that is passed through or positioned in L-brackets 152 and 153.

A helical compression spring 154 is slid onto shaft 151 and flat washers 155 are positioned on either end of helical compression spring 154. Also, tubular sleeve 156 is positioned around shaft 151 between L-bracket 152 and L-bracket 153. Shaft 151 is secured into place using lock nut 157 on the outside of L-bracket 153 (on the side of the L-bracket 153 facing away from L-bracket 152). Also, lock washer 158 and lock washer 159 may be positioned on either side of tubular sleeve 156 between L-bracket 152 and L-bracket 153. Shaft 151 is also passed through both sides of fixed mounting bracket 114. That is, one end of fixed mounting bracket 114 may be positioned between tubular sleeve 156 and L-bracket 152 and the other end of fixed mounting bracket 114 may be positioned between the other end of tubular sleeve 156 and L-bracket 153.

Handle 160 may be positioned on an end of shaft 151 and secured thereto using clevis pin 161 and spacer 162 and spacer 163 on either end of clevis pin 161. Also, cotter pin 164 may be positioned on an end of clevis pin 161 to secure it in place inside handle 160. It will be understood that, while particular components of locking mechanism 150 are described herein, various parts may be omitted, or may be combined and formed integrally, or the parts may be arranged in different ways without departing from the spirit of the present disclosure. For example, while helical compression spring 154 is described, it will be appreciated that other types of springs or non-spring urging members may be used to apply pressure to L-bracket 152 as described below; or, while mounting bracket 114 is described as being attached to the bus, other types of fasteners may be used to secure rear-view mirror unit 110 or locking mechanism 150 to the vehicle.

Figure 8:
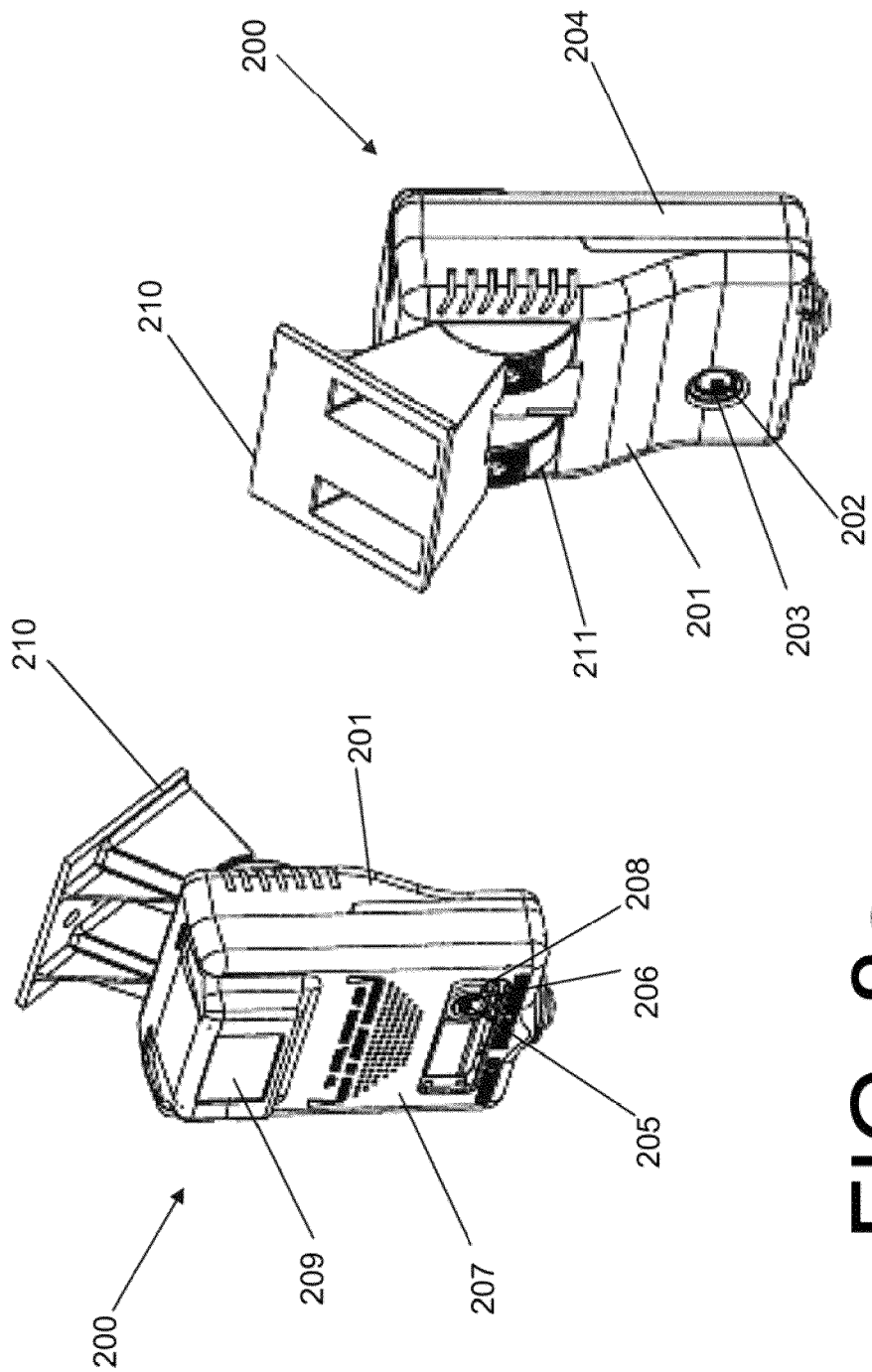
FIGS. 8a-b depict several views of a dual-vision camera system which may be used in conjunction with a rear-view mirror and modular monitor system in accordance with some embodiments of the invention.

FIGS. 8a-b depict several views of a dual-vision camera system which may be used in conjunction with a rear-view mirror and modular monitor system in accordance with some embodiments of the invention.

In some embodiments, a dual-vision camera system can be used in place of, or in conjunction with image capture device 130 to provide images and/or audio to modular monitor 120. The illustrative camera system, disclosed in incorporated by reference U.S. patent application Ser. No. 12/608,600 cited above, records images of both the interior and exterior of a vehicle. Specifically, the camera system provides for recording the interior and exterior of a vehicle on a continuous loop, with the oldest data erased by more recent video, and will save sequences of video and audio recordings based upon certain predetermined recording events.

The dual-vision system 200 of FIGS. 8a and 8b includes in at least one embodiment two cameras within the same housing: one camera captures video of the interior of the vehicle, while the second camera captures video of vehicles, pedestrians, road signs, traffic lights, etc. in front of the vehicle. In alternative embodiments, the dual-vision system 200 is provided with a microphone to record audio within the interior of the vehicle. In alternative embodiments, different numbers of cameras can be used with different field of views, from a single camera to a number of different cameras. One advantage of the camera system is that it allows the recording of the video of the driver and/or passengers of the vehicle in addition to video of the outside of the vehicle to allow review of events, such as distractions to the driver within the vehicle, car accidents, near-accidents, etc.

For example, according to one embodiment, the camera system records images from both a camera pointed in the direction of travel of the vehicle as well as a camera pointed towards the interior of the vehicle. In some embodiments, the cameras capture images at regular intervals, for example, one frame every second or every other second, whereas in other embodiments, the cameras capture motion video at 15 frames per second, 24 frames per second or 30 frames per second. In alternative embodiments, the camera system stores video in a continuous loop on a memory or other standard data storage device, for example, a standard SD card. As will be understood, other types of standard memory devices such as hard drives, data storage, tape drives, etc. are contemplated by the camera system. In alternative embodiments, the memory card, e.g., SD card and the like, for the recording device is removable. The memory card may be lockable to prevent theft or tampering with the data.

Video will continue to be captured, overwriting non-protected portions of the memory until a recording event occurs such as the driver activating a panic button, a g-force measured beyond a certain threshold by an accelerometer in 3-axis, a g-force measured beyond a certain threshold by an accelerometer in 2 axis, a sufficient bump is measured by an accelerometer, excessive brake is measured by an accelerometer or other device connected to the vehicle braking system, speed exceeds a certain predetermined threshold, and the like. Audio and/or video captured in response to a recording event is stored for later review and will not be overwritten by continuous loop recording until indicated by an individual with sufficient permissions, e.g., transportation manager. Captured video and/or audio recorded in response to a recording event, in alternative embodiments, is recorded on a separate part of the memory card or alternatively a separate memory that cannot be over-written except by someone with additional permissions, e.g., transportation manager. In some embodiments, video and/or audio captured before and/or after the event is stored in a separate memory or protected area of the memory or marked as non-erasable to prevent its erasure. In some embodiments, the type of recording event, e.g., braking event, collision, etc., is stored along with the audio and/or video of the recording event to allow sorting of recordings at a later time.

In certain embodiments, the dual-vision system 200 is provided with a built-in standard GPS sensor, which can determine the location, speed and direction of the vehicle. In certain embodiments, the GPS location of the vehicle is recorded along with the audio and/or video recorded in a continuous loop. In other embodiments, the GPS location is recorded only when a recording event occurs. In alternative embodiments, the dual camera system unit 200 can optionally connect directly to the windshield or other location of the vehicle directly without the need of an additional enclosure. For example, the slots/grooves on either the front or back side can be used to connect/slide into any standard mounting unit for connection to the vehicle.

In alternative embodiments, an event counter is beneficially provided that counts by each type of recording event in the aggregate and/or separate counter for each type of event. The counter includes or is connected to a display that displays either always or by request/actuation of a switch that optionally is only accessible to the manager for efficient determination whether the actual recording events should be viewed by, e.g., the manager.

In alternative embodiments, an audible chime is included that makes an audible sound and/or light indicator that illuminates if the vehicle/driver exceeds predetermined speed and/or for predetermined recording events such as excessive braking, and the like.

In alternative embodiments, a delay timer is included which allows the device to continue to capture video for a predetermined time after the ignition is turned off. Alternatively, the system captures still frames at regular intervals (e.g. 15 or 30 sec) to see if anyone is in and/or around the vehicle and/or captures video and/or still images when the ignition is off and a motion detector is triggered to prevent theft and/or record events in the vicinity of the vehicle.

In alternative embodiments, when forward and backward cameras are used, either two separate cameras are provided on opposite sides of a mirror, such as a rearview mirror, one camera pointing forward and another pointing backward. In other embodiments, a single structure having two cameras integrated therein, one pointing forward and the second pointing backward as described herein may be used.

According to one embodiment of the invention, the camera system is provided with a housing containing two cameras, where each camera is directed in opposite directions to capture images in the interior of a vehicle and exterior of a vehicle. For example, referring to FIGS. 8a and 8b, one embodiment of the camera system is depicted. A dual-vision system 200 is shown, where a front housing 201 contains a first camera opening 202 that allows a first camera 203 to be directed to the front of the vehicle when dual-vision system 200 is mounted, for example, within a vehicle. A back housing 207 contains a second camera opening 205 that allows a second camera 206 to be directed to the interior of the vehicle when the dual-vision system 200 is mounted within a vehicle. Either or both of first camera 203 and second camera 206 may be wide-angle, fixed focal length and/or zoom to allow various views from the cameras. Back housing 207 may optionally contain a microphone opening 208 to enable recording audio within the vehicle during operation. Front housing 201 and back housing 207 may be composed of any suitable material such as, for example, plastic, resin, metal, etc. In alternative embodiments, the housing may be connected to the exterior of the vehicle and/or may be used for other applications besides connection to the vehicle.

A light source 209 is provided that illuminates the interior of the vehicle during low lighting situations. In some embodiments, light source 209 is a replaceable standard infrared LED light source or other standard light source. Light source 209 can be provided with a clear protective lens, which is easily replaceable, and can protect expensive optical elements that could be vandalized. According to some embodiments, the light source 209 automatically illuminates vehicle interior in low light conditions. Light source 209 may alternatively provide illumination in a visible range, infrared range or both. The light source 209 can be compact and attachable without hardware, or it may have a low profile, with fasteners required for assembly. In embodiments wherein light source 209 provides illumination in an infrared range, second camera 206 is supplied with at least one image sensor capable of sensing light in the infrared range.

Mount 210 is optionally provided that connects dual-vision system 200 to a windshield, ceiling, mirror or dashboard. The housing attaches to the windshield/ceiling mount via tooth mesh (similar to gears, except there is no rotation permitted when the securing screw is tightened). The housing mount can be adjusted in reference to the mount by way of mount hinge 211 so that it always is in a vertical and/or predetermined position. The disclosed camera system provides significant advantages of recording, while not degrading the (sometimes) limited amount of open space available for the driver to maintain maximum visibility through the windshield.

Figure 9:
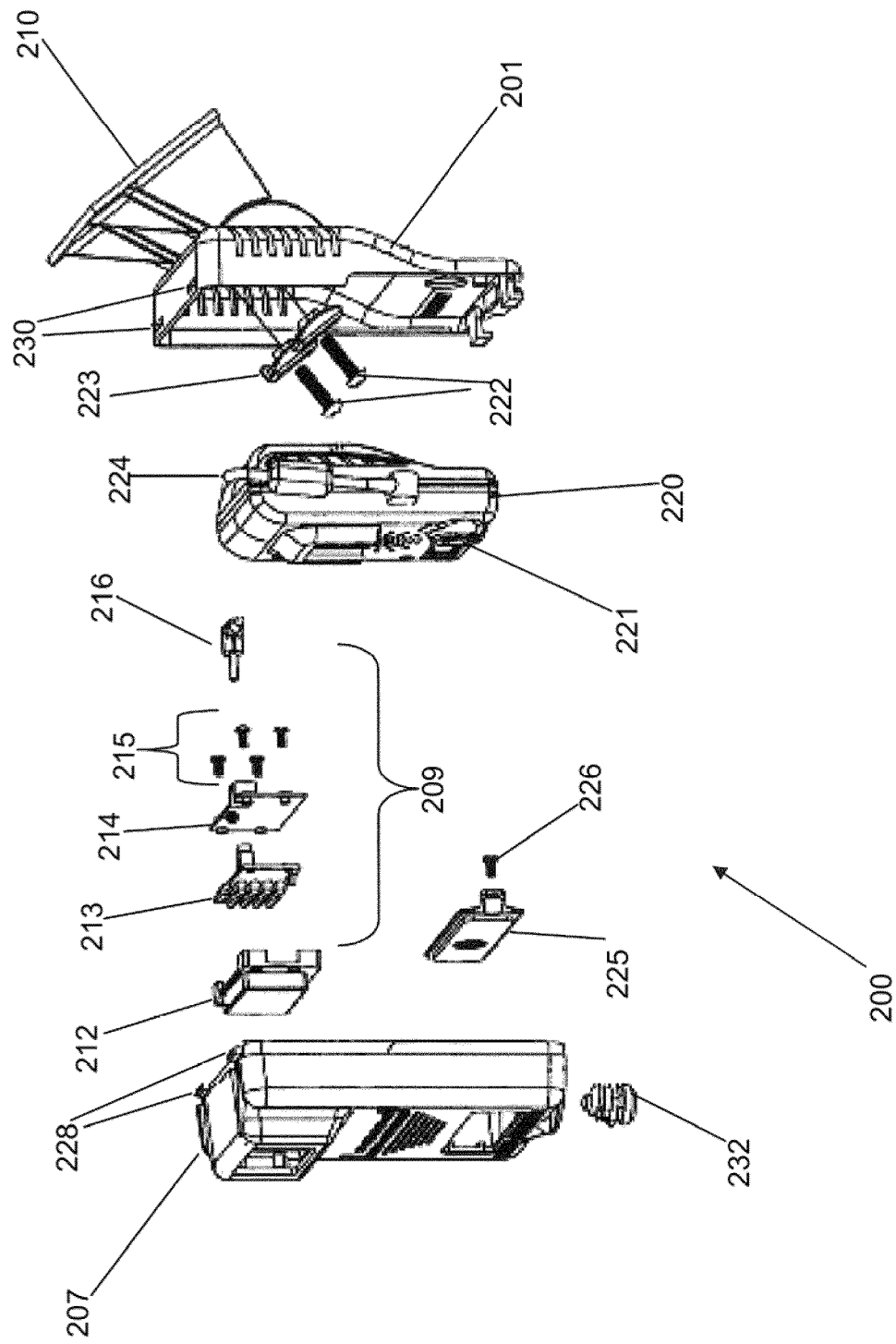
FIG. 9 depicts an exploded view of a dual-vision camera system in accordance with some embodiments of the invention.

FIG. 9 depicts an exploded view of a dual-vision camera system in accordance with some embodiments of the invention. Referring to FIG. 9, an exploded view of a dual-vision system 200 according to some embodiments of the invention is depicted. Light source 209 is comprised of clear LED protective lens 212, LED circuit board 213, LED backplate 214, one or more screws 215 and LED power jack 216. In some embodiments, protective lens 212 contains a filter to provide illumination in other light ranges such as, for example, infrared. In operation, LED circuit board may provide illumination in various light ranges such as, visible or infrared. Power jack 216 may be connected to an independent power source or may share a power source with other components of system 200. Light source 209 can be a preassembled component that snaps into housing back 207 or is received by an indent in housing back 207. In other embodiments, light source 209 is fixed to housing back 207 by screws or rivets. In alternative embodiments, the light source may be integrated with one or more of the cameras, may be separately mounted to the housing and/or may include a plurality of different types of light sources directed in any number of directions.

Camera unit 220 contains first camera (not shown) and second camera 221. In various embodiments, camera unit 220 is provided with at least one microphone for recording audio in addition to the outputs of the camera. Camera unit 220 may advantageously be affixed, via for example, being snapped into one or both of housing back 207 and housing front 201, or may be received by an indent in one or both of housing back 207 and housing front 201. In other embodiments, camera unit 220 is fixed to one or both of housing back 207 and housing front 201 by screws or rivets. Camera unit 220 is provided with power through power cable 224 and an optional light source. In some embodiments, camera unit may be connected to an independent power source, may include its own power source and/or may share a power source with other components of system 200. According to one advantage of the present invention, camera unit 220 is portable and a self-contained unit that may be advantageously be removed from the housing to protect the camera unit, light source and/or memory from theft, tampering and/or vandalism. In other embodiments, camera unit 220 and light source 209 may be advantageously removed from the housing together to provide portability and protection of the cameras, memory, processor, recording unit and/or LED circuit board 213.

Camera unit 220 of the present invention in at least one embodiment is connected to the vehicle's ignition system to receive power. In accordance with this embodiment, the camera unit(s) will only start when ignition is turned on. In some embodiments, the camera unit(s) stops capturing audio/video after a preset (user determined) interval or immediately after ignition is turned off. In other embodiments, power to the dual-camera system is provided through a cigarette lighter cord, standard 120V or 240V power cord, USB cord, or the like. In other embodiments, the dual-camera system is hardwired into the electrical system of the vehicle.

In other embodiments, a rechargeable battery powers the system 200 and camera unit 220. Camera unit 220 optionally operates (on battery power) even when it is not cradled in the housing, in case the driver needs to capture audio/video outside the camera's normal field of vision (e.g., vehicle body damage after a collision). Alternative power mechanisms and/or battery backup mechanisms may be used, and alternative procedures for starting and stopping recording of audio and/or video may be utilized.

Additionally, camera unit 220 is provided with means for recording the output of the cameras. For example, in some embodiments unit 220 is provided with an internal hard drive, data storage device and/or other standard memory device to record the outputs of the cameras and optional microphone. In various embodiments, the outputs of the cameras and optional microphone are recorded instead of the fixed memory device and/or in addition to the fixed memory storage device, on removable media such as, for example, SD memory. In one embodiment, each of the first and second cameras are connected via 16-bit connection to a circuit board, and a memory device such as an SD card. Direct connection enables the memory to receive the video and audio signals in their original digital format, and store it as such. As will be understood, the memory device may be removed from the housing to allow the contents of the memory to be reviewed at another location. Further, the portability of the memory device protects it from theft and vandalism An adjustment mechanism is provided that allows the angle of the housing to be changed relative to the surface to which the system 200 is mounted. Screws 222 are used to connect housing front 201 to mount 210. Pressure bushings 223 are provided such that sufficient clamping force is used to prevent housing front 201 from loosening from the mount 210. Mount 210 may be adjusted to change the angle of the dual-vision system 200 with respect to, for example, windshields or dashboards with various slopes or angles while allowing the dual-vision system 200 to remain fixed in a vertical position.

Figure 10:
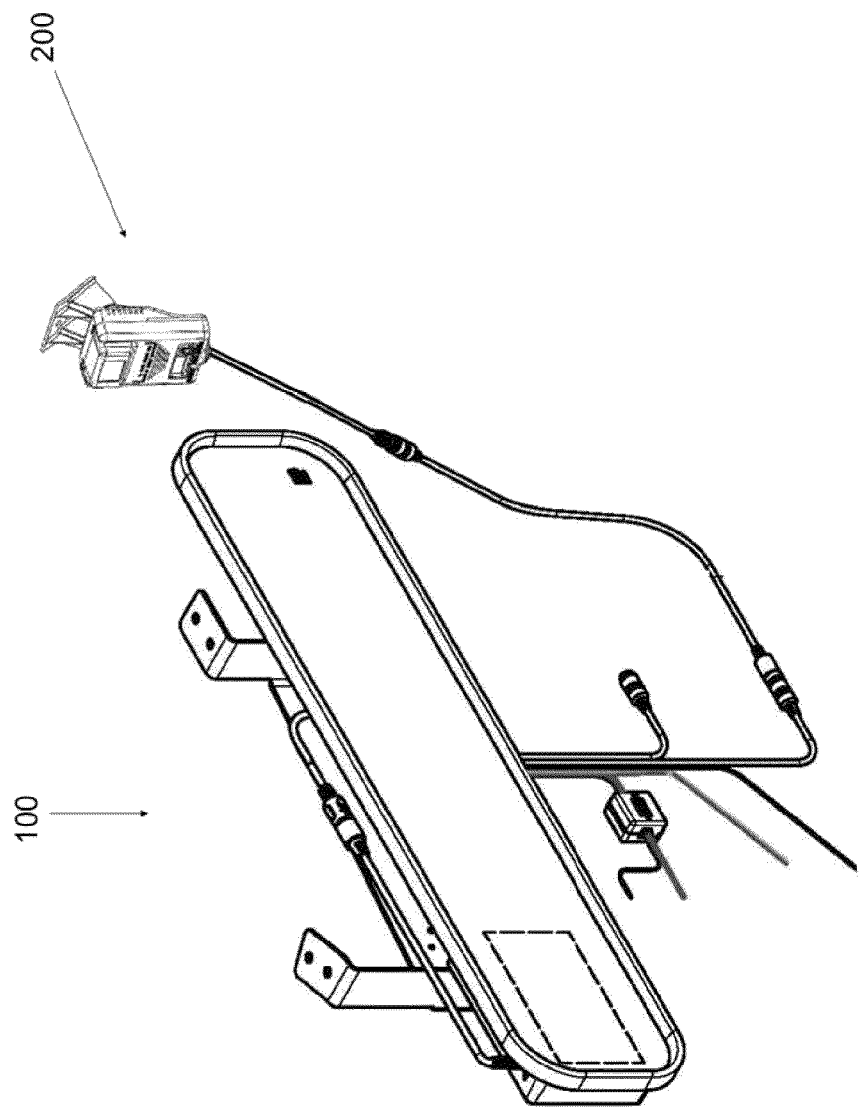
FIG. 10 depicts the rear-view mirror and modular monitor assembly with the dual-vision camera system of FIGS. 8a-b shown connected to an input in accordance with some embodiments of the invention.

FIG. 10 depicts a rear-view mirror and modular monitor assembly with the dual-vision camera system of FIGS. 8a-b shown connected to an input in accordance with some embodiments of the invention.

Figure 11:
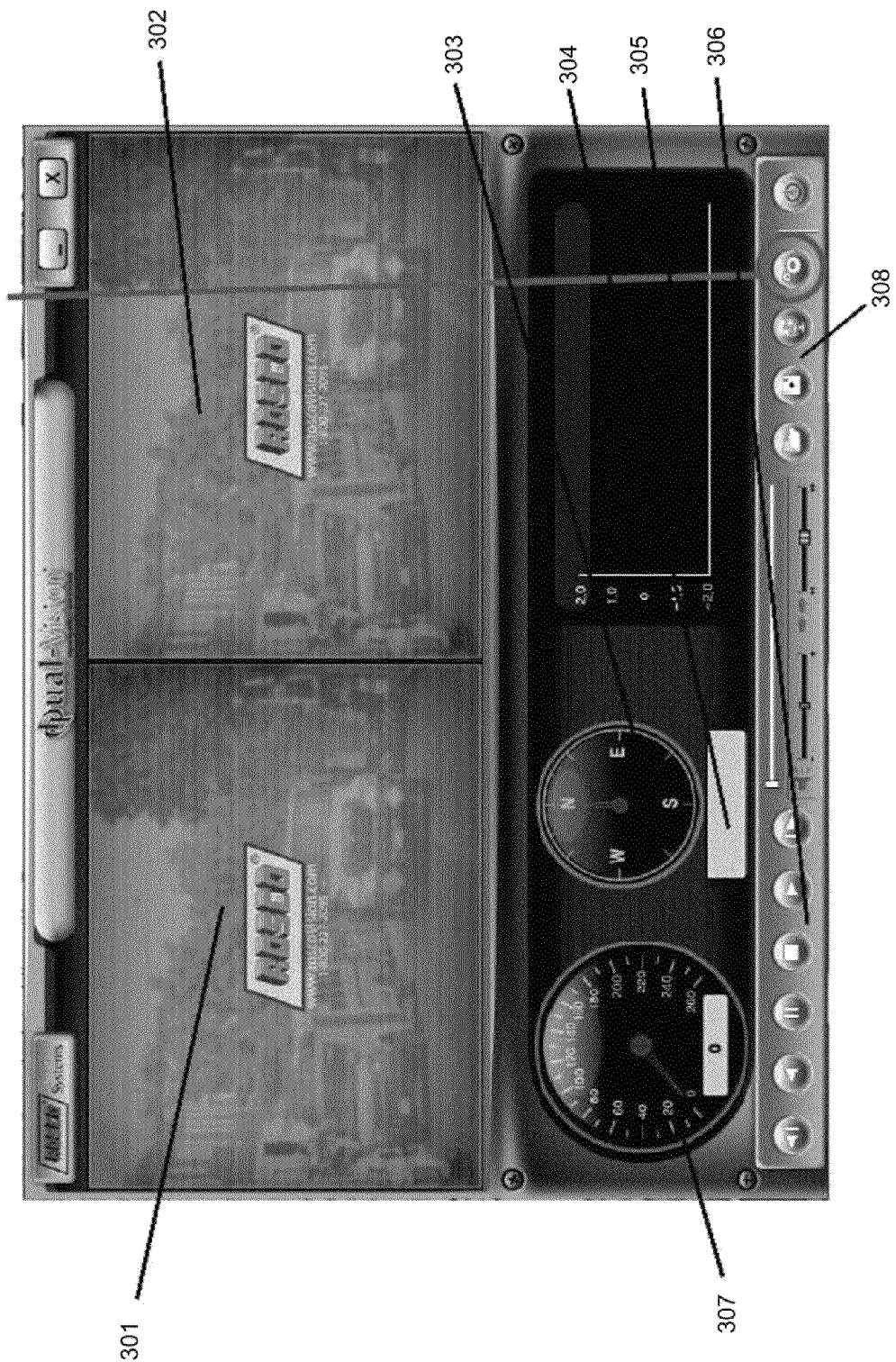
FIG. 11 depicts a screen view of review software which may be used in conjunction with a rear-view mirror and modular monitor input in accordance with some embodiments of the invention.
Figure 13A:
FIGS. 13a-b depict yet other alternative embodiments of the review software of FIG. 11 in accordance with some embodiments of the invention.
Figure 13B:

FIG. 11 depicts a screen view of review software which may be used in conjunction with a rear-view mirror and modular monitor input in accordance with some embodiments of the invention. In some embodiments, rear-view mirror and modular monitoring system 100 and dual-vision camera system 200 can be used in conjunction with the review software on a computer system. The review software as disclosed in U.S. patent application Ser. No. 12/608,600 cited above, and incorporated herein by reference, is as follows: Referring to FIG. 11, one embodiment of review software 300 is depicted. As shown, windows 301 and 302 are provided to allow viewing of the video captured by a first camera and a second camera. As will be appreciated, additional cameras and associated windows may be provided for the system to allow captured video in other directions. Referring to FIGS. 13a and 13b, clicking on one of windows 301 or 301 with a mouse temporarily enlarges the window to provide more detail for review. A second click on an enlarged window returns the window to its original size. Referring again to FIG. 11, compass 303 indicates the direction of travel of the vehicle during the portion of video under review. Direction of travel of the vehicle may be determined at the time of recording by one or more of a compass or a GPS receiver. GPS coordinate window 304 indicates the location of the vehicle at during the portion of the video under review in longitude and latitude. The GPS coordinates can be determined at the time of recording by one or more of a GPS receiver or dead reckoning device. Window 305 indicates the output of the 2-d or 3-d accelerometers and displays vehicle motion and any impact detected by the accelerometers graphically in 3-axis. Playback controls 306 allow a user to play, fast forward, rewind, play in slow motion and stop video playback of one or both camera video output. Playback controls also allow the user to change the playback speed of the video of one or both cameras. In addition, playback controls 306 allow personnel to advance or reverse the video of one or both of the cameras frame by frame. Controls also provide for volume adjustment of associated audio recordings. Speedometer 307 indicates the speed of the vehicle during the portion of video under review. Speed of the vehicle may be determined at the time of recording by one or more of a vehicle speedometer or a GPS receiver. The file controls 308 allow a file to be opened, conversion of the file into AVI format (or other appropriate file format), link the recorded data with a map, access other system features, e.g., a system setup menu, exit or close the review program and hide or close the review window(s).

Figure 12:
FIG. 12 depicts an alternative embodiment of the review software of FIG. 11 in accordance with some embodiments of the invention.

FIG. 12 depicts an alternative embodiment of the review software of FIG. 11 in accordance with some embodiments of the invention. Referring to FIG. 12, according to an alternative embodiment of the review software, a reviewer is able to simultaneously view video captured by one or both cameras in addition to a map displaying the position of the vehicle at the time the video was captured. The position of the vehicle is determined with an associated GPS receiver, which is recorded in memory as described elsewhere in this disclosure. According to various embodiments, the camera system is configured to work with third-party mapping software, for example, Google Earth™ that allows a user to view positions in satellite photos of the vehicle location.

FIGS. 13a-b depict yet other alternative embodiments of the review software of FIG. 11 in accordance with some embodiments of the invention. Referring to FIGS. 13a and 13b, an embodiment of the review software is depicted. The review software is advantageously configured to allow a user to select a video window for enlargement so that a user may inspect detail within the video. The user may select one or both of the video captured by the first camera or the second camera to be enlarged. The user may select the video for enlargement by clicking a mouse or other indication peripheral device or by one or more keystrokes on a keyboard.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Although the present invention has been described and illustrated in the foregoing exemplary embodiments, it is understood that the present disclosure has been made only by way of example, and that numerous changes in the details of implementation of the invention may be made without departing from the spirit and scope of the invention.

What is claimed is:

1. A rear-view mirror and modular monitor system for enhanced viewing by a vehicle operator of areas within and/or exterior to a vehicle comprising:
   a rear-view mirror unit comprising a mirror and a mirror unit backing, said rear-view mirror unit being mounted forward of the vehicle operator and at a location unobstructive of the vehicle operator's forward field of view, at least one section of the mirror comprising at least one of a see-through mirror glass and a display aperture;
   at least one monitor module fastened to the rear-view mirror unit and aligned with the at least one of the see-through mirror glass section and the display aperture, said at least one monitor module being configured to be unfastenable and removable from the rear-view mirror unit and refastenable to at least one of the rear-view mirror unit and another rear-view mirror unit; and
   a first image capture device mounted at a first location at least one of inside and outside the vehicle, and configured to capture and transmit a first image to the at least one monitor module, the first image being displayable on the at least one monitor module;
   wherein, when the first image is transmitted to the at least one monitor module and displayed on the at least one monitor module, the first image is viewable through the at least one of the see-through mirror glass section and the display aperture.

2. The system of claim 1, further comprising a gasket disposed between the at least one see-through mirror glass section and the at least one monitor module, said gasket being configured to channel visible light emitted from a display on the at least one monitor module through the at least one of the see-through mirror glass section and the display aperture of the mirror, while providing protection for the display when the at least one monitor module is fastened to the rear-view mirror unit.

3. The system of claim 2, wherein the gasket is shaped so as to be proximately alignable with a perimeter of the display.

4. The system of claim 1, further comprising at least one image storage device configured for image storage.

5. The system of claim 4, further comprising a protective enclosure encasing the first image capture device and the at least one image storage device, said protective enclosure being configured to enclose the first image capture device and the at least one image storage device, and to protect the first image capture device and the at least one image storage device from at least one of damage, tampering, and theft.

6. The system of claim 1, further comprising at least one connection device temporarily connecting the at least one monitor module to the rear-view mirror unit and enabling the at least one monitor module to be removed from and reconnected to or replaced from at least one of the rear-view mirror unit and another rear-view mirror unit.

7. The system of claim 1, wherein the first image is at least one of captured, transmitted, and displayed responsive to at least one of a manually selected view, an automatically selected view, and an event-triggered selected view.

8. The system of claim 1, further comprising a second image capture device mounted at a second location at least one of inside and outside the vehicle, and configured to capture and transmit a second image to the at least one monitor module; and
    an input switch connected to the first image capture device and the second image capture device, and configured to provide at least one of the first image and the second image to the at least one monitor module responsive to at least one of a manually selected view, an automatically selected view, and an event-triggered selected view.

9. The system of claim 8, wherein the at least one monitor module further comprises at least two channels configured to receive the first image and the second image, the at least one monitor module further configured to display the first image and the second image one of together in a multiple-feed configuration and individually in a single-feed configuration responsive to the input switch.

10. The system of claim 1, further comprising a first audio capture device mounted at a first location at least one of inside and outside the vehicle; and
    the at least one monitor module further comprising a first audio input and at least one audio output device;
    wherein the first audio capture device is configured to capture a first audio signal and provide the first audio signal to the first audio input of the at least one monitor module, and wherein, the at least one audio output device of the at least one monitor module is configured to provide the first audio signal to the vehicle operator.

11. The system of claim 10, wherein the first location of the first audio capture device is proximate to the first location of the first image capture device, and wherein the at least one monitor module is configured to provide the first audio signal to the vehicle operator responsive to the first image being displayed on the at least one monitor module.

12. The system of claim 1, wherein the at least one see-through mirror glass section is configured so as to be reflective when no image is displayed on the at least one monitor module, and sufficiently transparent for the first image to be viewable when the first image is displayed on the at least one monitor module.

13. The system of claim 1, the at least one monitor module further comprising at least one photocell light sensor configured to detect ambient light at the location of the at least one monitor module,
    wherein the at least one monitor module is further configured to adjust a brightness level of the first image when the first image is displayed, responsive to the at least one photocell light sensor.

14. A rear-view mirror and modular monitor system for enhanced viewing by a vehicle operator of areas within and/or exterior to a vehicle comprising:
    a rear-view mirror unit comprising a mirror and a mirror unit backing, said rear-view mirror unit being mounted forward of the vehicle operator and at a location unobstructive of the vehicle operator's forward field of view, at least a section of the mirror comprising see-through mirror glass;
    at least one monitor module fastened to the rear-view mirror unit, aligned with the see-through mirror glass section, said at least one monitor module being configured to be unfastenable and removable from the rear-view mirror unit and refastenable to at least one of the rear-view mirror unit and another rear-view mirror unit;
    a first image capture device mounted at a first location at least one of inside and outside the vehicle, and configured to provide a first image to the at least one monitor module, the first image being displayable on the at least one monitor module;
    a second image capture device mounted at a second location at least one of inside and outside the vehicle, and configured to provide a second image to the at least one monitor module, the second image being displayable on the at least one monitor module; and
    an input switch connected to the first and second image capture devices, and configured to provide at least one of the first image and the second image to the at least one monitor module responsive to at least one of a manually selected view, an automatically selected view, and an event-triggered selected view;
    wherein, when at least one of the first image and the second image is provided to the at least one monitor module and displayed on the at least one monitor module, the at least one of the first image and the second image is viewable through the see-through mirror glass section.

15. The system of claim 14, further comprising a first audio capture device mounted proximate to the first location of the first image capture device and a second audio capture device mounted proximate to the second location of the second image capture device;
    the at least one monitor module further comprising a first audio input, a second audio input, and at least one audio output device;
    wherein the first audio capture device is configured to capture a first audio signal and provide the first audio signal to the first audio input of the at least one monitor module, and the second audio capture device is configured to capture a second audio signal and provide the second audio signal to the second audio input of the at least one monitor module;
    and wherein, the at least one audio output device of the at least one monitor module is configured to provide at least one of the first audio signal to the vehicle operator responsive to the first image being displayed on the at least one monitor module, and the second audio signal responsive to the second image being displayed on the at least one monitor module.

16. The system of claim 14, further comprising an image storage device configured to store at least one of the first image and the second image.

17. A method of providing a rear-view mirror and modular monitor system for enhanced viewing by a vehicle operator of areas within and/or exterior to a vehicle comprising the at least one of sequential, non-sequential, and sequence-independent steps of:

(a) mounting a rear-view mirror unit forward of the vehicle operator and at a location unobstructive of the vehicle operator's forward field of view, said rear-view mirror unit comprising a mirror and a mirror unit backing, at least one section of the mirror comprising see-through mirror glass;

(b) fastening at least one monitor module to the rear-view mirror unit aligned with the at least one see-through mirror glass section such that the at least one monitor module is unfastenable and removable from the rear-view mirror unit and refastenable to at least one of the rear-view mirror unit and another rear-view mirror unit;

(c) mounting a first image capture device at a first location at least one of inside and outside the vehicle, the first image capture device being configured to capture and transmit a first image to the at least one monitor module;

(d) connecting the first image capture device to the at least one monitor module, using at least one of a wired and wireless connection, to provide the first image to the at least one monitor module viewable through the at least one see-through mirror glass section.

18. The method of claim 17, further comprising installing a gasket between the at least one see-through mirror glass section and the at least one monitor module, said gasket being configured to channel visible light emitted from a display on the at least one monitor module through the at least one see-through mirror glass section of the mirror, while providing protection for the display when the at least one monitor module is fastened to the rear-view mirror unit.

19. The method of claim 18, further comprising aligning the gasket with a perimeter of the display and securing the gasket in place.

20. The method of claim 17, further comprising providing at least one image storage device configured for image storage.

21. The method of claim 20, further comprising providing a protective enclosure encasing the first image capture device and the at least one image storage device, said protective enclosure being configured to enclose the first image capture device and the at least one image storage device, and to protect the first image capture device and the at least one image storage device from at least one of damage, tampering, and theft.

22. The method of claim 17, wherein the step of fastening the at least one monitor module to the rear-view mirror unit further comprises temporarily connecting the at least one monitor module to the rear-view mirror unit using at least one connection device and enabling the at least one monitor module to be removed from and re-connected to or replaced from at least one of the rear-view mirror unit and another rear-view mirror unit.

23. The method of claim 17, wherein the first image is at least one of captured, transmitted, and displayed responsive to at least one of a manually selected view, an automatically selected view, and an event-triggered selected view.

24. The method of claim 17, further comprising mounting a second image capture device at a second location at least one of inside and outside the vehicle, the second image capture device being configured to capture and transmit a second image to the at least one monitor module; and installing and connecting an input switch to the first image capture device and the second image capture device, the input switch configured to provide at least one of the first image and the second image to the at least one monitor module responsive to at least one of a manually selected view, an automatically selected view, and an event-triggered selected view.

25. The method of claim 24, further comprising providing the at least one monitor module with at least two channels configured to receive the first image and the second image; and displaying the first image and the second image one of together in a multiple-feed configuration and individually in a single-feed configuration responsive to the input switch.

26. The method of claim 17, further comprising mounting a first audio capture device at a first location at least one of inside and outside the vehicle;

providing the at least one monitor module with a first audio input and at least one audio output device;

capturing a first audio signal using the first audio capture device and providing the first audio signal to the first audio input of the at least one monitor module; and providing the first audio signal to the vehicle operator using the at least one audio output.

27. The method of claim 26, wherein the step of mounting the first audio capture device comprises mounting the first audio capture device proximate to the first location of the first image capture device, wherein the at least one monitor module is configured to provide the first audio signal to the vehicle operator responsive to the first image being displayed on the at least one monitor module.

28. The method of claim 17, further comprising configuring the at least one see-through mirror glass section so as to be reflective when no image is displayed on the at least one monitor module, and sufficiently transparent for the first image to be viewable when the first image is displayed on the at least one monitor module.

29. The method of claim 17, further comprising providing the at least one monitor module with at least one photocell light sensor configured to detect ambient light at the location of the at least one monitor module, wherein the at least one monitor module is further configured to adjust a brightness level of the first image when the first image is displayed, responsive to the at least one photocell light sensor.

30. A method of providing a rear-view mirror and modular monitor system for enhanced viewing by a vehicle operator of areas within and/or exterior to a vehicle comprising the at least one of sequential, non-sequential, and sequence-independent steps of:

(a) mounting a rear-view mirror unit forward of the vehicle operator and at a location unobstructive of the vehicle operator's forward field of view, said rear-view mirror unit comprising a mirror and a mirror unit backing, at least one section of the mirror comprising see-through mirror glass;

(b) fastening at least one monitor module to the rear-view mirror unit aligned with the at least one see-through mirror glass section such that the at least one monitor module is unfastenable and removable from the rear-view mirror unit and refastenable to at least one of the rear-view mirror unit and another rear-view mirror unit;

(c) mounting a first image capture device at a first location at least one of inside and outside the vehicle, the first image capture device being configured to provide a first image to the at least one monitor module;

(d) mounting a second image capture device at a second location at least one of inside and outside the vehicle, the second image capture device being configured to provide a second image to the at least one monitor module;

(e) connecting an input switch to the first and second image capture devices using at least one of a wired and wireless connection, to provide at least one of the first image and the second image to the at least one monitor module responsive to at least one of a manually selected view, an automatically selected view, and an event-triggered selected view;

(f) digitally capturing at least the first image by the first image capture device and the second image by the second image capture device;

(g) digitally transmitting at least one of the first image and the second image to the at least one monitor module responsive to the at least one of the manually selected view, the automatically selected view, and the event-triggered selected view; and (h) displaying at least one of the first image and the second image on the at least one monitor module, wherein the at least one of the first image and the second image is viewable through the at least one see-through mirror glass section.

31. The method of claim 30, further comprising mounting a first audio capture device proximate to the first location of the first image capture device and a second audio capture device proximate to the second location of the second image capture device;

providing the at least one monitor module with a first audio input, a second audio input, and at least one audio output device;

capturing a first audio signal with the first audio capture device, and transmitting the first audio signal to the first audio input of the at least one monitor module responsive to the capturing of the first image;

capturing a second audio signal with the second audio capture device, and transmitting the second audio signal to the second audio input of the at least one monitor module responsive to the capturing of the second image;

providing the first audio signal to the vehicle operator via the at least one audio output device responsive to the first image being displayed in the single-feed configuration on the at least one monitor module; and providing the second audio signal to the vehicle operator via the at least one audio output device responsive to the second image being displayed in the single-feed configuration on the at least one monitor module.

32. The method of claim 30, further comprising providing an image storage device and storing at least one of the first image and the second image in the image storage device.

33. In a method of repairing a rear-view mirror and modular monitor system, the system comprising a rear-view mirror unit comprising a mirror and a mirror unit backing, said rear-view mirror unit being mounted forward of the vehicle operator and at a location unobstructive of the vehicle operator's forward field of view, at least one monitor module fastened to said rear-view mirror unit, a first image capture device mounted at a location at least one of inside and outside the vehicle, and configured to provide a first image to the at least one monitor module, the method comprising the at least one of sequential, non-sequential, and sequence-independent steps of:

unfastening the at least one monitor module from the rear-view mirror unit;

replacing one of the at least one monitor module and the rear-view mirror unit with a replacement part comprising one of another at least one monitor module or another rear-view mirror unit;

positioning the at least one monitor module with respect to at least one of a see-through mirror glass and a display aperture of the mirror;

positioning at least one gasket between the at least one monitor module and the at least one of a see-through mirror glass and a display aperture; and refastening one of the at least one monitor module and the rear-view mirror unit to the replacement part to secure the replacement part to replace at least one of the at least one monitor module and the rear-view mirror unit.

34. The method of claim 33, wherein the step of unfastening the at least one monitor module from the rear-view mirror unit further comprises locating a plurality of fasteners, said fasteners having been threaded through a plurality of mirror apertures positioned around the at least one see-through mirror glass section of the mirror, and through a plurality of monitor apertures positioned around a frame of the at least one monitor module so as to align with the plurality of mirror apertures, each of the plurality of fasteners having been secured with a nut to fasten the at least one monitor module to the rear-view mirror unit; and removing the nuts from the plurality of fasteners thereby allowing the at least one monitor module to be unfastened from the rear-view mirror unit.

35. The system of claim 1, wherein said mirror unit backing includes an aperture, and said at least one monitor module is configured to be inserted in the aperture of the mirror unit backing, fastened to the mirror unit backing using fasteners and aligned with the at least one of the see-through mirror glass section and the display aperture.

\* \* \* \* \*